Dec. 2, 1941.    L. L. HARE    2,264,975
DEVICE FOR FACILITATING THE TESTING OF INFLATED ARTICLES
Filed Feb. 25, 1939

INVENTOR
Leonard L. Hare
BY Edward H. Lang
ATTORNEY

Patented Dec. 2, 1941

2,264,975

UNITED STATES PATENT OFFICE 2,264,975

DEVICE FOR FACILITATING THE TESTING OF INFLATED ARTICLES

Leonard L. Hare, Villa Park, Ill., assignor to The Pure Oil Company, Chicago, Ill., a corporation of Ohio Application February 25, 1939, Serial No. 258,557

4 Claims. (Cl. 73—51)

This invention relates to an improved device for use in the testing of expansible, gas inflated articles such as for example, the inner tubes of automobile tires.

In the past it has been customary to test rubber inner tubes by the well known method of immersing the inflated tubes in water whereupon any leaks are indicated by the appearance of air bubbles. This method, while satisfactory in some respects, has several very undesirable disadvantages. The water baths used for this purpose are unpleasant to work in under conditions of low temperature. Furthermore, the removal of water from the surface of the inner tube after the test has been completed is a difficult and time consuming operation. Failure to remove the water reasonably completely prior to repair and insertion of the tube into the tire casing causes repair patches to fail to adhere properly and promotes deterioration of the rubber from which such articles are made. Moreover, very small leaks may not be found in such a test due to the low pressure at which such tests must be conducted. Inflation of such tubes in excess of a pressure of a few pounds causes uneven and extreme distortion of the tubes. Application of further pressure is a hazardous procedure as a portion of the tube may be stretched beyond the limit of elasticity and rupture of the tube may result.

It is an object of this invention to overcome such disadvantages by the use of an appropriately formed net equipped with suitable fastening means which will encase the inner tube or other article and which may be quickly assembled in locked position and taken apart. No water is required for the proposed means of testing and the tubes when encased in the net may be inflated to about 10 or 15 pounds per square inch pressure which is ample pressure to readily detect the smallest of leaks. At a pressure of this magnitude any leaks are easily found by the noise of the escaping air and due to the open construction of the net, the exact points of such leaks are readily determined. The avoidance of the use of water eliminates the attendant evils of unsatisfactory repair or more rapid deterioration of the tube due to residual moisture on the tube.

These and other objects and advantages of the invention will be apparent from the accompanying description and drawing of which Figure 1 is a diagrammatic perspective view showing a device in accordance with the invention as it appears when closed over an inflated inner tube ready for use.

Figure 1:
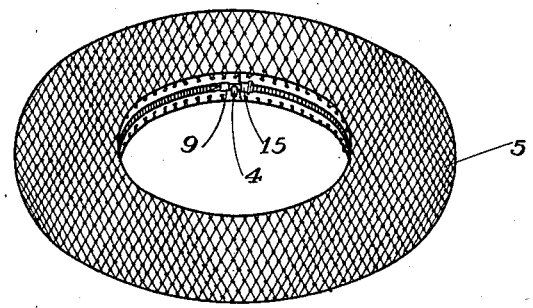
Figure 3:
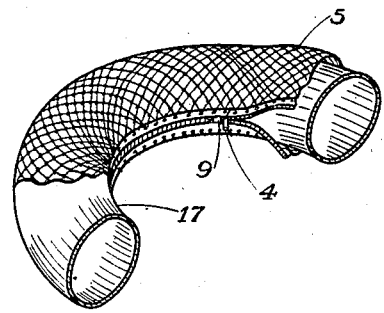
Figure 3 is a diagrammatic fragmentary perspective view showing a portion of an automobile inner tube with the net partially placed thereon.
Figure 2:
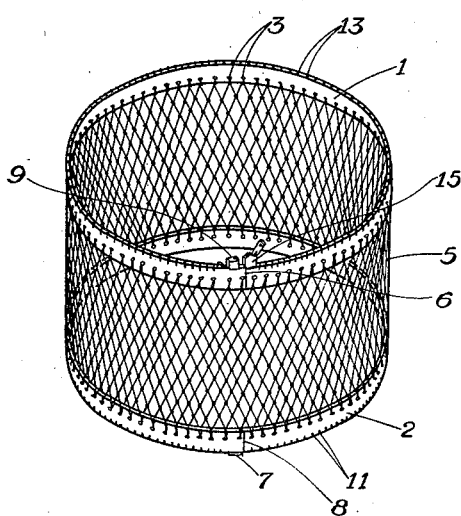
Figure 2 is a diagrammatic perspective view showing the net as it appears in its open extended position.

Referring more particularly to the drawing, the numerals 1 and 2 represent flexible stringers or tapes, preferably of strong woven material such as canvas or similar cloth which is perforated at spaced intervals with holes 3 preferably reinforced with grommets made of metal or other reinforcing material. The ends of the tapes are sewn or otherwise fastened together as shown at 6 and 8. A net 5 cylindrical in shape and open at both ends is attached to the tapes 1 and 2 by suitably interlacing it through the holes 3. The net may be made of any of a number of suitable materials of low elasticity. I have found that heavy cotton twine of approximately $\frac{1}{16}$ inch to $\frac{1}{8}$ inch in diameter is both economical and satisfactory. The size and shape of the net is such that when the edges are brought together in a manner to be subsequently described, the net will form a doughnut-like ring or annulus approximately the size of an inflated inner tube of popular size. The cord is woven and knotted into a net of suitable mesh so that easy access to any point of the tube may be had and at the same time there will be sufficient strength in the net so that when the tube is inflated to a pressure of 10 to 15 pounds per square inch it will be kept from swelling beyond its normal inflated size. A knotted net woven similar to a fishing net and of approximately $\frac{1}{2}$ to $1\frac{1}{2}$ inches mesh is satisfactory. To the upper edge of the upper tape 1 and to the lower edge of the lower tape 2 is attached a flexible slide fastener such for example, as the familiar Talon fasteners or the fasteners shown in U. S. Patents Nos. 1,830,077 and 2,027,708. A pin 7 attached to the lower tape 2 is adapted to fit into a socket 9 attached to the upper take 1 in order to join together the upper and lower edges after which the interlocking elements 11 and 13 are engaged by means of the closure element 15, producing a strong, continuous union of the upper and lower edges of the net and forming a closed net casing or envelope which fits around the inner tube 17 in a manner clearly shown in Figures 2 and 3.

The method of operating my novel device is as follows:

The inner tube which it is desired to test for leaks is preferably deflated and placed inside the net 5 and the upper edge 1 and lower edge 2 brought together at the inner perimeter of the tube adjacent the valve stem 4. The fastening pin 7 is inserted into the socket 9 and the closure element 15 is moved until the interlocking elements 11 and 13 are engaged around the entire circumference of the edges of tapes 1 and 2, the closure element 15 stopping adjacent the opposite side of the valve stem from which the closing operation was started. The inner tube is then inflated to about 10 pounds per square inch pressure. Due to the presence of the net the tube will not be distorted substantially beyond the size which it normally attains when in use on an automobile. At a pressure of this magnitude even the smallest of leaks are easily detected due to the noise of the escaping air. The exact point of the leak may be precisely located and marked since the open character of the net permits access to practically all points of the tube. The fact that the fastener is continuous and positively interlocks precludes any difficulty as to uneven inflation or bulges in the tube or to sudden expansion due to an accidental release of the fastening device. After the leak has been definitely located and marked the tube is deflated, the slide fastener disengaged and the pin 7 removed from the socket 9 after which the net and tube are completely free of each other.

Although the invention has been particularly described with reference to its use for testing inner tubes, it should be understood that the invention is intended for use in determining leaks in any shaped expansible body, the device being appropriately shaped to fit the particular type of body intended to be tested.

It will be apparent that various changes and modifications of my device may be made without departing from the scope of my invention. It is intended that the invention shall be broadly interpreted and limited only by the following claims.

I claim:

1. A device of the character described including a flexible, substantially non-elastic, cylindrical net open at the top and bottom, interlocking slide fastening means attached to the upper and lower edges of said net and adapted, when interlocked, to form said net into a closed circular net casing.

2. A device of the character described including a flexible, substantially non-elastic, cylindrical net open at the top and bottom, separate flexible strips perforated with holes at spaced intervals and to which the top and bottom of the net are separately interlaced, interlocking slide fastening means comprising one series of elements attached to the strip at the top of said net and one series of elements attached to the strip at the bottom of said net and adapted when interlocked, to form said net into a closed circular net casing.

3. A device for testing for leaks in inflatable bodies which comprises a net formed of substantially non-elastic material, said net being annular-shaped when open, a series of interlocking flexible slide closing and locking elements attached to said net in such manner as to form said net when closed into an annulus.

4. A device of the character described including a normally cylindrical-shaped net open at both ends, a series of interlocking slide fastening elements attached to the end portions of said net in such manner as to form said net into a closed annular net casing when said elements are in interlocking engagement.

LEONARD L. HARE.